United States Patent
Parikka et al.

(10) Patent No.: US 6,888,676 B2
(45) Date of Patent: May 3, 2005

(54) METHOD OF MAKING POLARIZER AND ANTIREFLECTION MICROSTRUCTURE FOR MOBILE PHONE DISPLAY AND WINDOW

(75) Inventors: Marko Parikka, Salo (FI); Kaj Saarinen, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/396,733

(22) Filed: Mar. 20, 2003

(65) Prior Publication Data

US 2004/0184147 A1 Sep. 23, 2004

(51) Int. Cl.[7] .......................... B29D 11/00; B32B 31/04; B32B 31/12; B32B 31/18; B32B 31/20
(52) U.S. Cl. ....................... 359/491; 359/900; 264/1.34; 264/1.35; 264/1.6; 264/1.7; 264/2.6; 264/134; 264/135; 264/171.1; 264/171.13
(58) Field of Search ............................... 264/1.31, 1.34, 264/1.35, 1.6, 1.7; 359/490, 491, 900, 2.6, 134, 135, 171.1, 171.13

(56) References Cited

U.S. PATENT DOCUMENTS

| | | | | |
|---|---|---|---|---|
| RE23,297 E | * | 11/1950 | Hyman, Jr. et al. | ......... 359/491 |
| 5,885,490 A | * | 3/1999 | Kawaguchi et al. | ....... 264/1.32 |
| 5,973,834 A | * | 10/1999 | Kadaba et al. | ............... 359/490 |
| 6,111,696 A | * | 8/2000 | Allen et al. | .................. 359/495 |
| 6,359,735 B1 | * | 3/2002 | Gombert et al. | ............ 359/580 |
| 6,366,335 B1 | * | 4/2002 | Hikmet et al. | ............... 349/193 |
| 6,570,710 B1 | * | 5/2003 | Nilsen et al. | ................ 359/625 |
| 2003/0011315 A1 | * | 1/2003 | Ito et al. | ................... 315/169.3 |
| 2003/0058547 A1 | * | 3/2003 | Hori et al. | .................... 359/642 |
| 2003/0086170 A1 | * | 5/2003 | Hamamoto et al. | ......... 359/491 |
| 2003/0123244 A1 | * | 7/2003 | Ishitaka | ....................... 362/31 |

FOREIGN PATENT DOCUMENTS

WO    WO 99/50691 A1 * 10/1999

* cited by examiner

Primary Examiner—John Juba, Jr.
(74) Attorney, Agent, or Firm—Ware, Fressola, Van Der Sluys & Adolphson LLP

(57) ABSTRACT

A method of producing an antireflection structure for use on a display or a window surface or both in an electronic device, such as a mobile phone. The display can be an LCD with a top polarizer and a bottom polarizer. The antireflection structure is imparted on the top polarizer by a roller embossing process. In particular, the embossing is carried out in the same manufacturing process when the polarizer is produced. The antireflection structure has a plurality of sub-wavelength periodic grooves. The antireflection structure on the window surface can be imparted using an embossing process or an injection molding process.

13 Claims, 9 Drawing Sheets

METHOD OF MAKING POLARIZER AND ANTIREFLECTION MICROSTRUCTURE FOR MOBILE PHONE DISPLAY AND WINDOW

FIELD OF THE INVENTION

The present invention relates generally to an antireflection structure imparted on a surface of a display or window and, in particular, to the antireflection structure used on a mobile phone.

BACKGROUND OF THE INVENTION

When a mobile phone is used in a bright ambient light environment, the reflection of the ambient light from the display can be very disruptive, making the content of the display difficult to read. Reflection of ambient light can occur at a number of surfaces, especially at the dense-rare boundaries of an optical component. As shown in FIG. 1, reflection can occur at a number of surfaces of the display and the window on top of the display. Incoming light beam L1 can reflect at the top and the bottom dense-air boundaries of the window. The reflected light from the first reflection at the top dense-rare boundary is denoted by R1. The reflected light from the second reflection at the bottom dense-rare boundary is denoted by R2. Similarly, light can also reflect from the top dense-rare boundary of the display, resulting in reflected light R3. It is advantageous and desirable to reduce or substantially eliminate the reflections.

Antireflection coatings are known in the art. Usually one or two thin films of coating material are coated on a substrate surface in a vacuum chamber to reduce the reflection by destructive interference. Antireflection coatings are generally expensive because of the cost involved in the vacuum evaporation process and the low yield of the coating. It is advantageous and desirable to provide a method of producing an antireflection surface that is cost-effective.

Sub-wavelength periodic structures have been used for antireflection purposes. A typical antireflection grating is shown in FIG. 2. As shown in FIG. 2, a surface structure 2 having a pitch P can be imparted on a substrate 5. To be used as an antireflection structure, the pitch P of the surface structure 2 must be smaller than the wavelength of the ambient light. Ophey et al. (U.S. Pat. No. 5,694,247, hereafter referred to as Ophey) discloses that a grating is imparted on optical components such as lenses and beam-splitters. In particular, Ophey discloses that in an optical transmissive device having an entrance surface and an exit surface for light transmission, the antireflection grating imparted on one surface is perpendicular to the antireflection grating imparted on another surface to avoid birefringent. Ophey discloses a molding technique combined with UV curing that is used to impart the grating on synthetic material layers comprised of poly-methyl methacrylate (PMMA) or polycarbonate (PC). Gaylord et al. (U.S. Pat. No. 5,007,708, hereafter referred to as Gaylord) discloses a number of techniques for producing antireflection grating surfaces on dielectrics, semiconductors and metals. In particular, Gaylord discloses surface-relief grating being formed by reactive ion etching, electron beam lithography, or holography.

While the prior art techniques have many advantages for their intended applications, they may not be applicable or cost-effective when the antireflection structure is used on a display that requires one or more polarization components.

SUMMARY OF THE INVENTION

It is a primary objective of the present invention to provide a cost-effective process for producing an optical structure on a display or window in an electronic device, such as a mobile phone, for reducing the boundary reflection on the top of the display or window or both. This objective can be achieved by using a roller embossing process to impart the optical structure directly onto an optical polarizer for use on a liquid-crystal display. This objective can also be partially achieved by using an injection molding process to impart the optical structure on a window.

Accordingly, the first aspect of the present invention provides a method of realizing a light reflection reduction structure on at least one surface of a display, wherein the display has at least one optical polarizing component disposed on top thereof, wherein the reflection reduction structure comprises a plurality of sub-wavelength periodic grooves, and wherein the polarizing component comprises an impressible film and a directional optical filter sheet. The method is characterized by attaching the impressible film to the directional optical filter sheet for forming a laminated sheet, and by imparting the periodic grooves on the impressible film.

Advantageously, the attaching of the impressible film to the filter sheet is carried out prior to or after the imparting of the periodic grooves.

Advantageously, the directional optical filter sheet has a first side and an opposing second side and the impressible film is attached to the first side of the filter sheet. The method is further characterized by attaching a further film to the filter sheet on the second side thereof.

Preferably, the directional optical filter sheet comprises a stretched film. The method is further characterized by applying iodine molecules onto the stretched film for affecting optical polarization.

Advantageously, the display comprises a liquid-crystal display and the display has a first side facing a user and an opposing second side, wherein the optical polarizing component is disposed on the first side.

Preferably, the imparting step is carried out using an embossing process using an embossing roller.

The second aspect of the present invention provides an optical component for use in an optical device. The optical component is characterized by:

a directional optical filter sheet, and by an impressible film, wherein the impressible film has a first side and an opposing second side attached to the directional optical filter sheet, and the first side of the impressive film includes a sub-wavelength periodic structure embossed thereon for reducing light reflection from the first side of the impressive film.

Advantageously, the optical device comprises a liquid-crystal display.

The third aspect of the present invention provides a mobile terminal, which comprises:

means for communicating with a network component in a communications network, a display for displaying information, a surface having a microstructure positioned relative to the display for reducing light reflection, and at least one optical polarizing component disposed between the surface and the display, wherein the microstructure comprises a plurality of sub-wavelength grooves.

The surface can be spaced from the optical polarizing component and can be used as a window, but the surface can also be attached to the optical polarizing component as part of the display. The sub-wavelength grooves on the window can be imparted by a roller embossing process or an injection molding process.

The present invention will become apparent upon reading the description taken in conjunction with FIGS. 3 to 6.

BEST MODE TO CARRY OUT THE INVENTION

Figure 1:
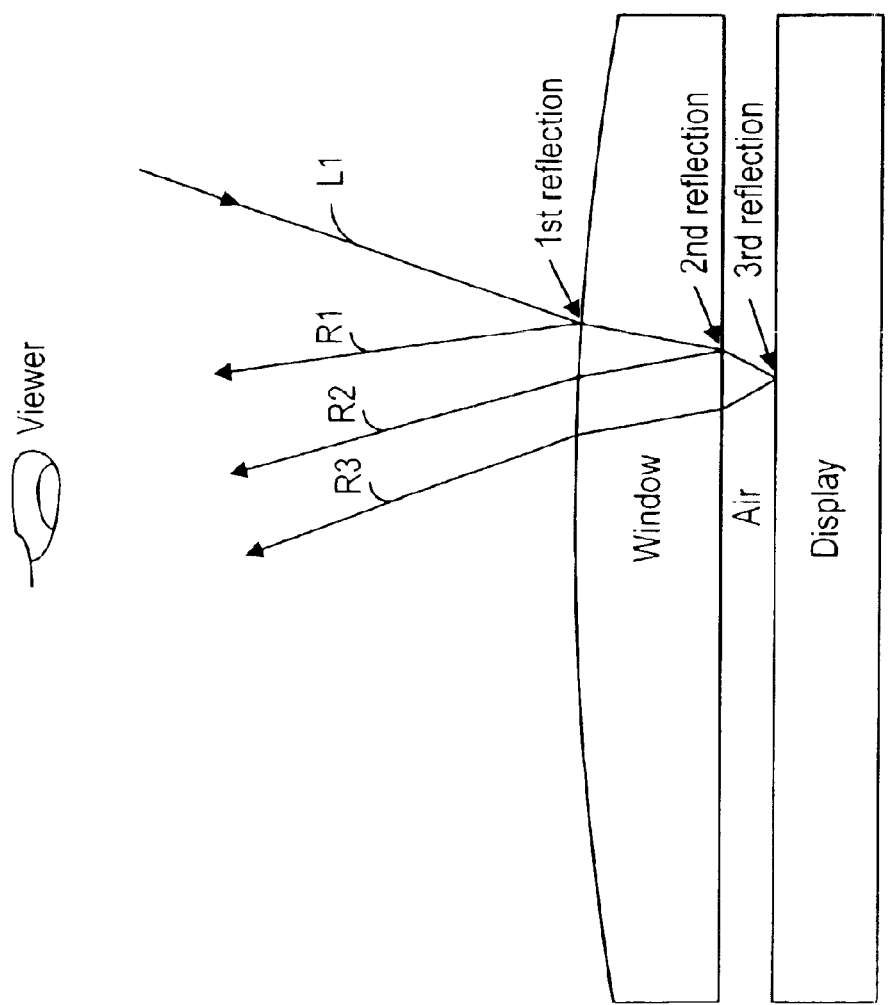
FIG. 1 is a schematic representation illustrating the reflections of ambient light from a number surfaces of an optical device.
Figure 2:
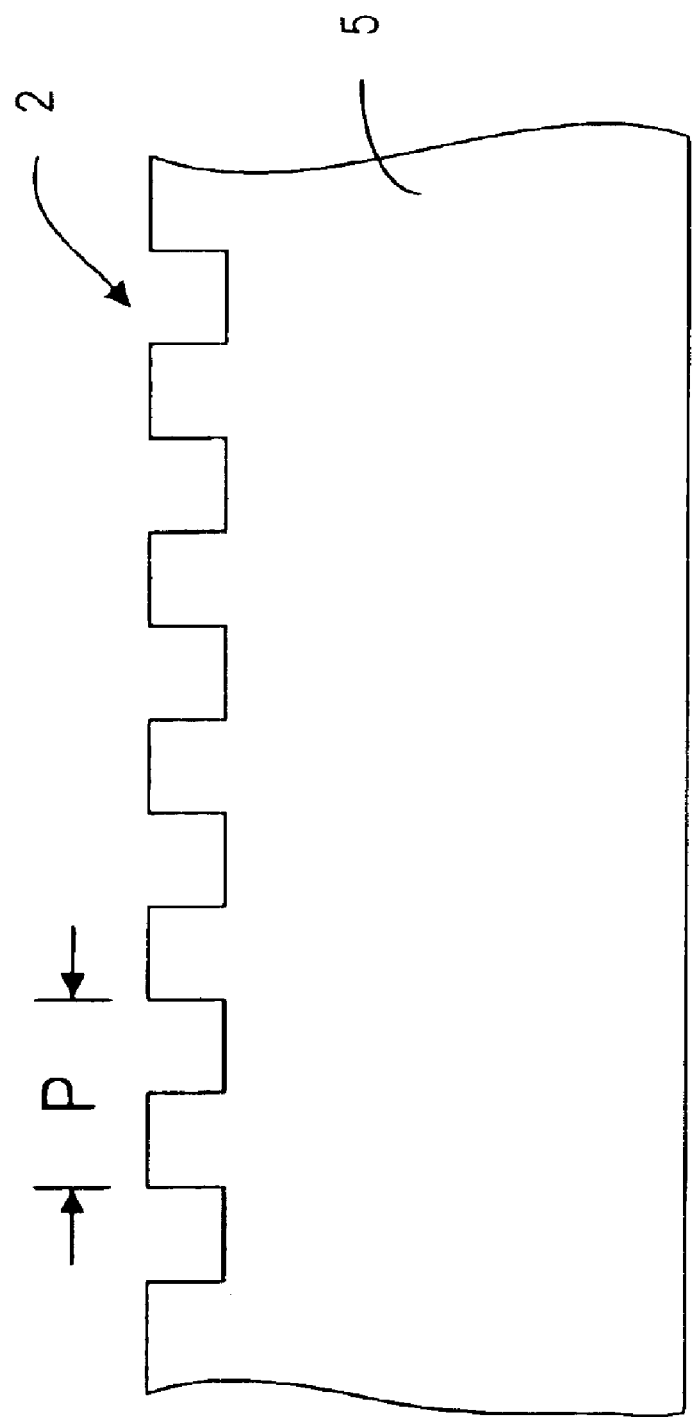
FIG. 2 is a schematic representation illustrating an antireflection surface structure, which is a grating with sub-wavelength periodic grooves.
Figure 3:
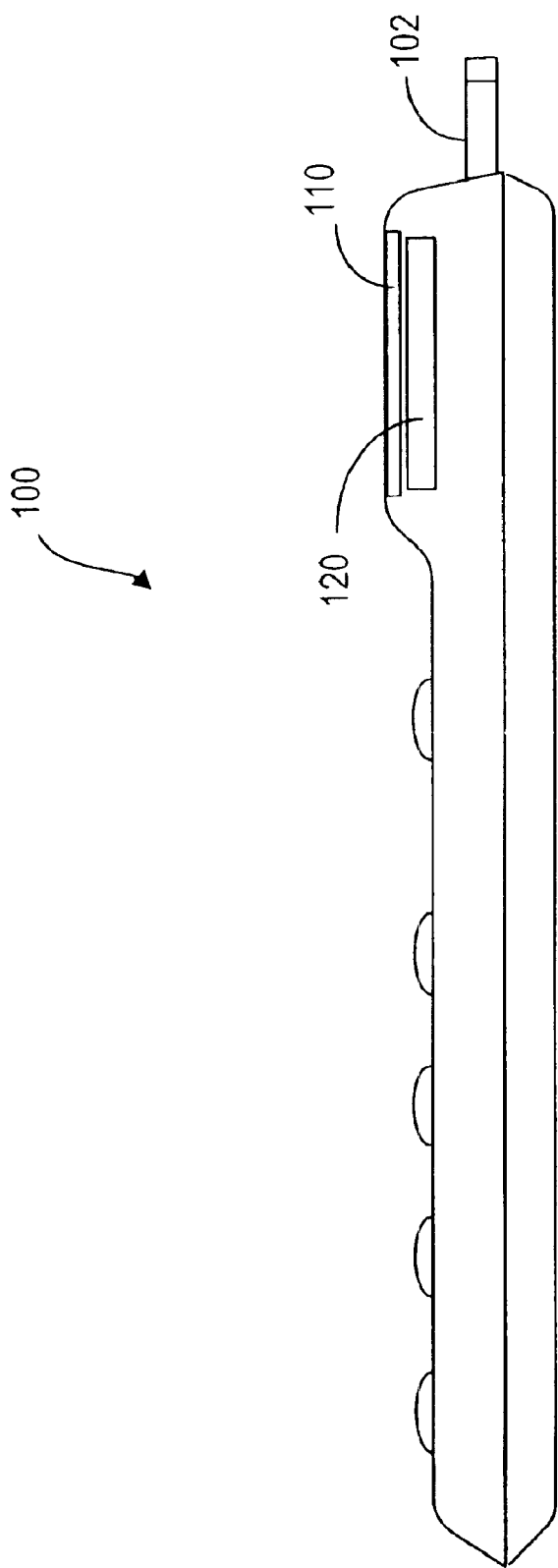
FIG. 3 is a schematic representation illustrating a mobile phone having a display.
Figure 4:
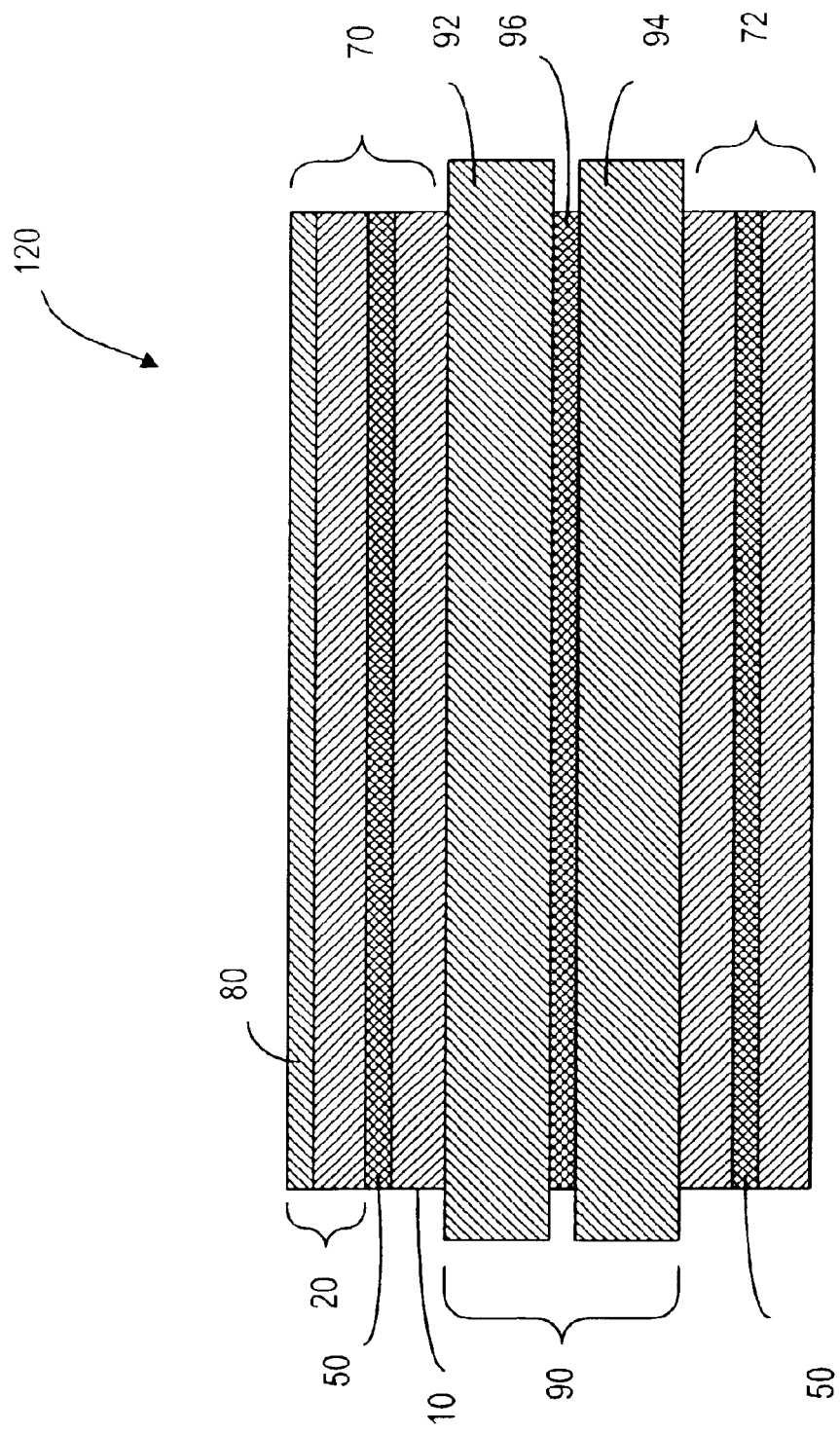
FIG. 4 is a schematic representation illustrating a typical liquid-crystal display (LCD).

A mobile phone 100, as shown in FIG. 3, has an antenna for communicating with another network component in a communications network, a display 120 for displaying information, and a window 110 on top of the display 120 for protecting the display 120 or for decorative purposes. It is desirable to impart an antireflection structure, such as that shown in FIG. 2, on both the top and the bottom dense-rare boundaries (see FIG. 1) of the window 110. The antireflection structure on the window can be imparted by an embossing process or an injection molding process. Furthermore, it is desirable to impart a similar antireflection structure on top of the display 120, as shown in FIG. 4. In particular, if the display is a liquid-crystal display (LCD) or the like, it is preferable to impart an antireflection structure on the top surface of the display. As shown in FIG. 4, the display 120 comprises a liquid crystal cell 90. Typically the liquid crystal cell comprises an upper plate 92 and a lower plate 94 forming a gap therebetween to accommodate a layer of liquid crystal material 96. The liquid crystal cell 90 is placed between two polarizers 70, 72. LCDs are known in the art and are not part of the invention. According to the present invention, an antireflection structure 80 is provided on top of the LCD 120 in order to reduce the reflections of ambient light from the top the LCD. In particular, the antireflection structure 80 is imparted on the top surface of the top polarizer 70. Typically, the polarizer 70 (or 72) comprises a stretched polymer film 50 attached with iodine. The polymer film 50 can be made of polyvinyl alcohol (PVA), for example. The stretched polymer film 50 attached with iodine is used as a directional optical filter to produce linearly polarized light from natural unpolarized light. This filter is laminated between two polymer sheets or films 10, 20, for example. The polymer films 10, 20 can be made of triacetyl cellulose (TAC), for example. According to the present invention, the antireflection structure 80 can be directly imparted on the top TAC film 20.

Figure 5A:
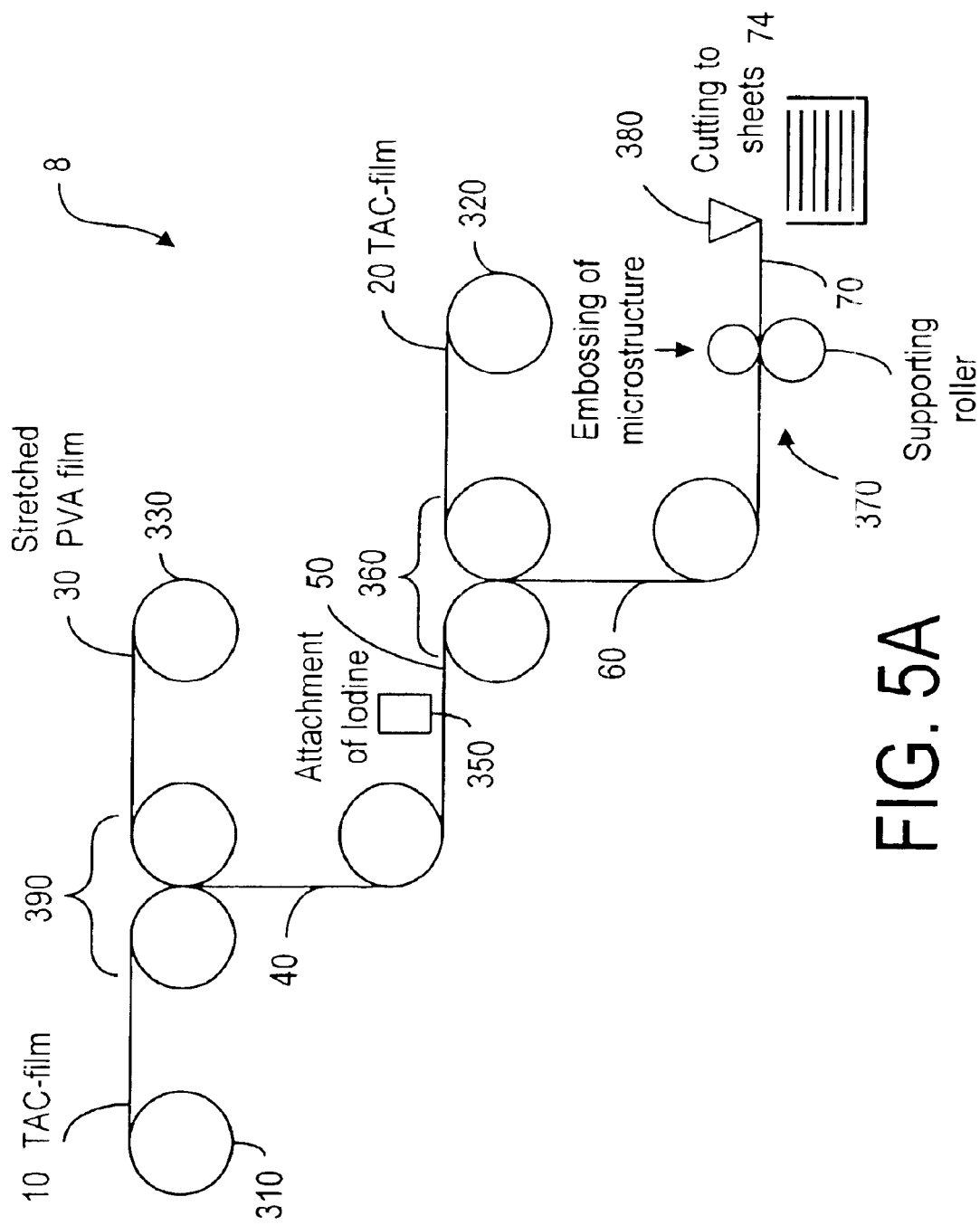
FIG. 5a is a schematic representation illustrating the preferred method of producing a polarizer sheet with an antireflection surface structure, according to the present invention.

It is preferred that the antireflection structure 80 is imparted on the TAC film 20 when the polarizer 70 is produced, as shown in FIGS. 5A–5D. As shown in FIG. 5A, the TAC film 10 is provided in a roll 310 and the mechanically stretched PVA film 30 is provided in a roll 330. Through a pair of laminating rollers 390, the TAC and the stretched PVA film 30 are laminated together into a laminated film 40. An iodine attachment apparatus 350 is then used to attach iodine molecules onto the stretched PVA film. The stretched PVA film with iodine attached is denoted by reference numeral 50. The TAC film 20 is also provided in a roll 320. Through a pair of laminating rollers 360, the iodine-attached film 50, and the TAC film 20 are laminated into a polarizer sheet 60. As the laminated sheet 60 passes through an embossing station 370, the PVA film 20 side of the laminated sheet 60 is embossed with the antireflection structure 80, preferably using a hot-embossing process. It is preferred that the embossed, laminated sheet 70 in a roll form is cut by a cutter 380 into cut sheets 74. In general, the width of the material rolls 310, 320 and 330 is much wider than the dimension of a typical display on the mobile phone. For example, the width of the rolls can be about 1 meter (approximately 3 feet), and the cut sheets can be 1 meter by 1 meter, for example. The producing method, as shown in FIG. 5A, is referred to as a roll-to-roll process 8. This process is suitable for large volume production and is, therefore, cost effective.

Figure 5B:
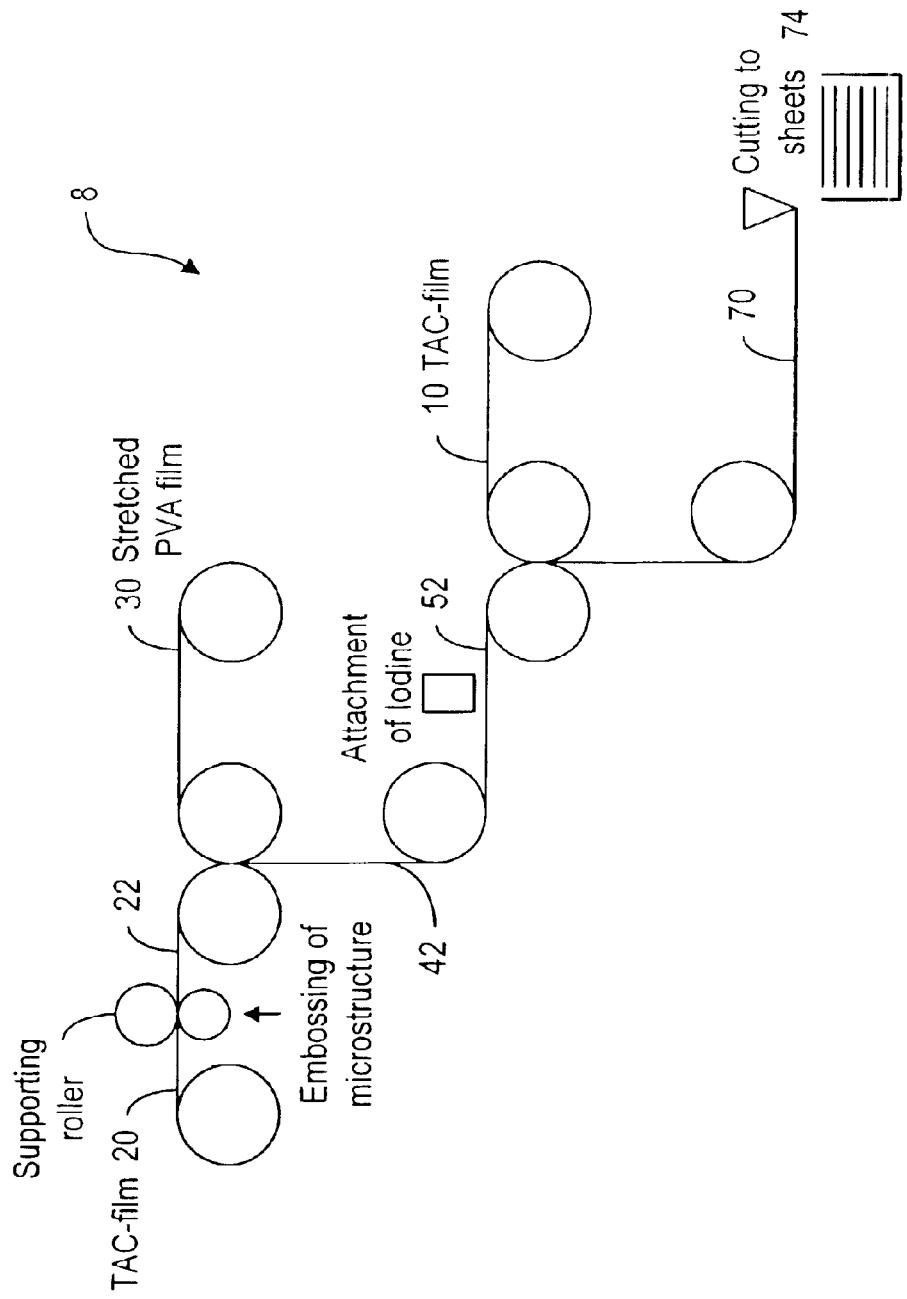
FIG. 5b is a schematic representation illustrating a different embodiment of the present invention.

In the preferred fabricating process, as shown in FIG. 5A, the embossing step is carried out after the iodine-attached stretched film is laminated with two protective TAC films 10, 20. However, the embossing step can be carried out differently. For example, the embossing of the top film can be carried out on the film itself prior to lamination. As shown in FIG. 5B, the TAC film 20 is first embossed with the antireflection structure 80. The embossed TAC film 22 is then laminated with the stretched PVA film 30 into an embossed, laminated film 42 before iodine is attached on the stretched PVA film 30. The embossed, laminated film with iodine attached is denoted by reference number 52. The embossed film 52 is further laminated with the bottom TAC film 10.

Figure 5C:
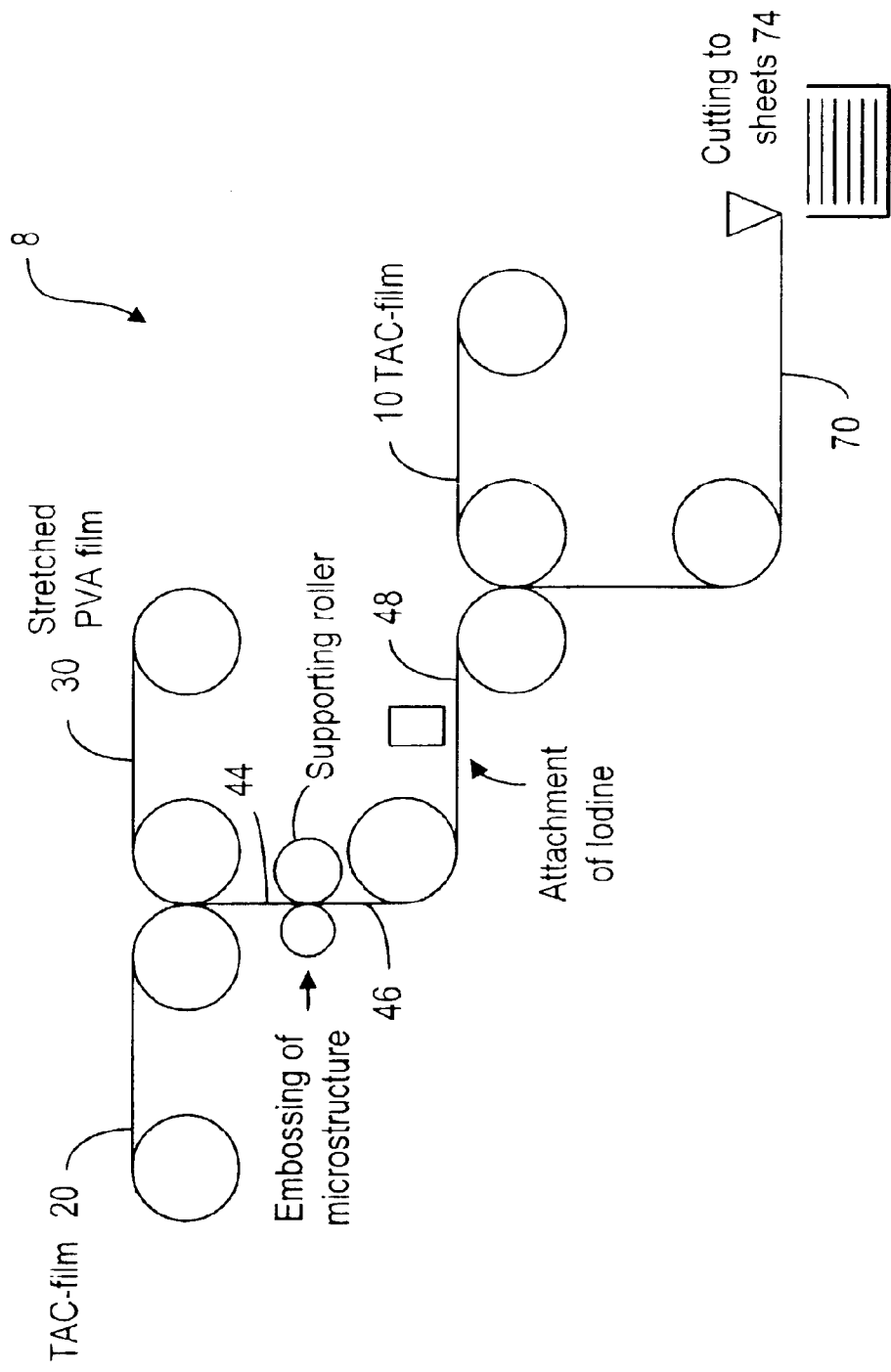
FIG. 5c is a schematic representation illustrating another embodiment of the present invention.

Alternatively, the embossing step is carried out after the top TAC film 20 and the stretched PVA film 30 are laminated into a laminated film 44. However, the embossing step is carried out before the iodine attachment process. As shown in FIG. 5C, the laminated film 44 is embossed into an embossed, laminated film 46 before it is attached with iodine. The iodine-attached film is denoted by reference number 48. The laminated film 48 and the bottom TAC film 10 are then lamination into the polarizer sheet 70.

Figure 5D:
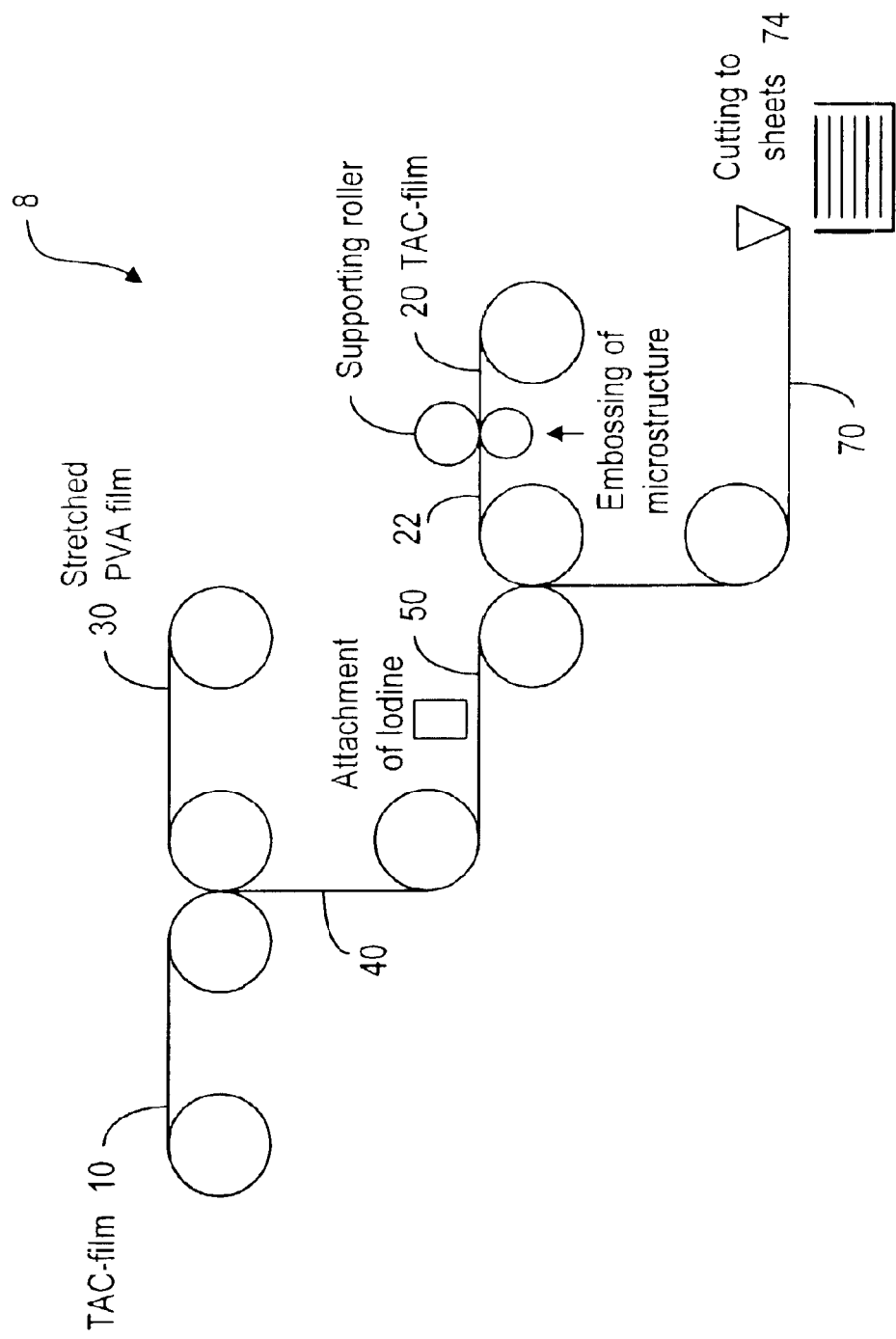
FIG. 5d is a schematic representation illustrating yet another embodiment of the present invention.

Another variation of the roll-to-roll process 8 of FIG. 5A is shown in FIG. 5D. As shown, the top TAC film 20 is embossed prior to the film 20 being laminated with the iodine-attached PVA film 50 and the lower TAC film 10 to become the polarizer sheet 70.

Figure 6:
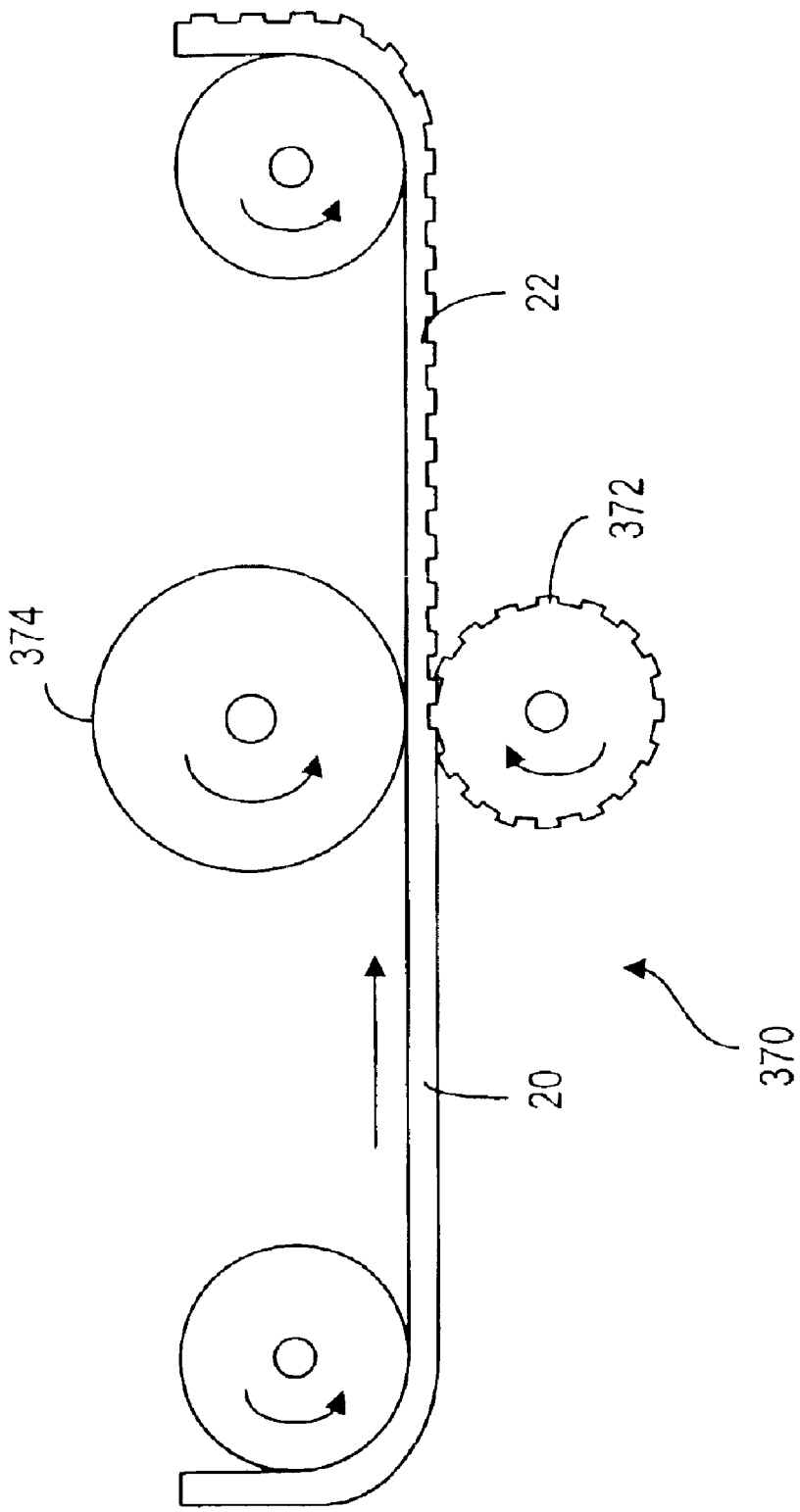
FIG. 6 is a schematic representation illustrating the details of the embossing process, according to the present invention.

FIG. 6 is a schematic representation illustrating the embossing station 370. As shown, the embossing station comprises mainly an embossing roller 372 and a supporting roller 374. On the surface of the embossing roller 372, a pattern is provided for embossing the antireflection structure 80. Typically, the pattern is made on a substrate by holographic lithography or electron-beam lithography and etched into a surface-relief structure. An electroforming process is then employed to generate a nickel plate (the so-called mother shim). Using the same electroforming process, this original nickel plate can be used to make the surface of the embossing roller 372. Using such an embossing roller to impart an antireflection structure directly on a polarizer during the same manufacturing process is advantageous in terms of manufacturing cost and product consistency. In particular, the roller embossing process for producing an antireflection structure is continuous and repeatable. Other methods for producing an antireflection surface, such as vacuum deposition or evaporation, reactive ion etching and electron beam lithography, are not continuous and repeatable.

As shown in FIG. 4, the antireflection structure 80 is imparted only on one side of the top polarizer 70. However, it is also possible to impart a similar antireflection structure 80 on the other side of the top polarizer 70. Furthermore, it is also possible to have one or two additional antireflection structures 80 imparted on the window 110 (FIG. 3). Preferably, the antireflection structure 80 has a pitch in the range of 150–400 nm, and the depth of the structure is in the range of 75–2000 nm. The preferred grating profile, as shown in FIG. 2, is binary. However, the profile can be triangular or sinusoidal or another periodic form.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of realizing a light reflection reduction structure on at least one surface of a display, wherein the display has at least one optical polarizing component disposed thereon and the reflection reduction structure comprises a plurality of sub-wavelength periodic grooves, and wherein the polarizing component comprises an impressible film and a directional optical filter sheet, said method characterized by attaching the impressible film to the directional optical filter sheet for forming a laminated sheet, and by imparting the periodic grooves on the impressible film, said method is further characterized in that the attaching of the impressible film to the filter sheet is carried out prior to the imparting of the periodic grooves.

2. The method of claim 1, characterized in that the directional optical filter sheet has a first side and an opposing second side, wherein the impressible film is attached to the first side of the filter sheet, said method further characterized by attaching a further film to the filter sheet on the second side thereof.

3. The method of claim 1, characterized in that the directional optical filter sheet comprises a stretched film, said method further characterized by applying iodine molecules onto the stretched film for effecting optical polarization.

4. The method of claim 3, characterized in that said applying is carried out before the directional optical filter sheet is attached to the impressible film.

5. The method of claim 1, characterized in that the display comprises a liquid-crystal display.

6. The method of claim 5, characterized in that the display has a first side facing a user and an opposing second side, wherein the optical polarizing component is disposed on the first side.

7. The method of claim 6, characterized in that the display further has a further optical polarizing component disposed on the second side of the display.

8. The method of claim 1, characterized in that the imparting step is carried out using an embossing process.

9. The method of claim 8, characterized in that the imparting of the periodic grooves on the impressible film is carried out using a roller having a surface with a pattern for imparting the periodic grooves.

10. The method of claim 1, further characterized in that the directional optical filter sheet comprises a stretched film, said method further characterized by:

applying iodine molecules onto the stretched film for effecting optical polarization, said applying carried out prior to the imparting of the periodic grooves.

11. The method of claim 1, further characterized in that the directional optical filter sheet comprises a stretched film, said method further characterized by:

applying iodine molecules onto the stretched film for effecting optical polarization, said applying carried out after the imparting of the periodic grooves.

12. A method of realizing a light reflection reduction structure on at least one surface of a display, wherein the display has at least one optical polarizing component disposed thereon and the reflection reduction structure comprises a plurality of sub-wavelength periodic grooves, and wherein the polarizing component comprises an impressible film and a directional optical filter sheet, said method characterized by attaching the impressible film to the directional optical filter sheet for forming a laminated sheet, and by mechanically imparting the periodic grooves on the impressible film, wherein the directional optical filter sheet comprises a stretched film, said method further characterized by applying iodine molecules onto the stretched film for effecting optical polarization, and that said applying is carried out after the directional optical filter sheet is attached to the impressible film and that the imparting of the periodic grooves is carried out prior to said attaching.

13. A method of realizing a light reflection reduction structure on at least one surface of a display, wherein the display has at least one optical polarizing component disposed thereon and the reflection reduction structure comprises a plurality of sub-wavelength periodic grooves, and wherein the polarizing component comprises an impressible film and a directional optical filter sheet, said method characterized by attaching the impressible film to the directional optical filter sheet for forming a laminated sheet, and by mechanically imparting the periodic grooves on the impressible film, said method characterized in that the impressible film is part of a film roll and the optical filter sheet is part of a sheet roll when they are attached together to form a laminated sheet as part of a laminated sheet roll, said method further characterized by cutting at least a part of the laminated sheet roll into sections after said imparting.

* * * * *

UNITED STATES PATENT AND TRADEMARK OFFICE
CERTIFICATE OF CORRECTION

PATENT NO. : 6,888,676 B2
DATED : May 3, 2005
INVENTOR(S) : Parikka et al.

It is certified that error appears in the above-identified patent and that said Letters Patent is hereby corrected as shown below:

<u>Title page,</u>
Item [56], References Cited, U.S. PATENT DOCUMENTS, insert missing references:
-- 5,007,708   04/1991   Gaylord et al.   350/162.2
   5,694,247   12/1997   Ophey et al.     359/566 --.

Signed and Sealed this

Sixteenth Day of August, 2005

JON W. DUDAS
*Director of the United States Patent and Trademark Office*